US006674379B1

United States Patent
Li et al.

(10) Patent No.: US 6,674,379 B1
(45) Date of Patent: Jan. 6, 2004

(54) DIGITAL CONTROLLER WITH TWO CONTROL PATHS

(75) Inventors: Qiong Li, Cortlandt Manor, NY (US); Demetri Giannopoulos, Norwalk, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/261,223

(22) Filed: Sep. 30, 2002

(51) Int. Cl.[7] .................................................. H03M 1/00
(52) U.S. Cl. ........................................ 341/123; 341/159
(58) Field of Search ................................. 341/123, 155, 341/159, 120; 323/234, 241

(56) References Cited

U.S. PATENT DOCUMENTS

| | | | | |
|---|---|---|---|---|
| 4,570,153 A | * | 2/1986 | Kobayashi et al. | 341/155 |
| 4,937,579 A | * | 6/1990 | Maio et al. | 341/165 |
| 5,198,748 A | * | 3/1993 | Tsui et al. | 324/76.35 |
| 5,633,811 A | * | 5/1997 | Canada et al. | 702/56 |
| 5,930,745 A | * | 7/1999 | Swift | 702/190 |
| 6,084,539 A | * | 7/2000 | Yamada | 341/155 |
| 6,392,583 B1 | * | 5/2002 | Bosselmann et al. | 341/155 |
| 6,414,612 B1 | * | 7/2002 | Quesenberry | 341/120 |
| 6,445,317 B2 | * | 9/2002 | Lundin et al. | 341/120 |
| 6,522,282 B1 | * | 2/2003 | Elbornsson | 341/155 |
| 6,600,438 B2 | * | 7/2003 | Hilton | 341/155 |

* cited by examiner

Primary Examiner—Peguy JeanPierre
(74) Attorney, Agent, or Firm—Aaron Waxler

(57) ABSTRACT

A digital controller comprises two control paths each having an A/D converter. One of the two converters has a substantially higher sampling speed and lower resolution than the other. Thus, one is suitable to deal with the fast responses while the other is suitable to deal with the slow responses, and can replace high-speed high-resolution A/D converter which is high in both cost and power consumption.

19 Claims, 1 Drawing Sheet

DIGITAL CONTROLLER WITH TWO CONTROL PATHS

FIELD OF THE INVENTION

This invention relates to controller technologies, and in particular, to a digital controller in which two control paths having different digital converters are utilized to generate a control signal.

BACKGROUND AND SUMMARY OF THE INVENTION

Because of its numerous advantages such as programmability, flexibility, immunity to noise and ease of integration, a digital controller is widely used to regulate an output of, for example, a power converter system (such as a lamp driver, motor driver, voltage regulator, etc.). As shown in FIG. 1, the digital controller 10 comprises an analog-to-digital (A/D) converter 11 to sense a signal $V_{sense}$, such as the regulated output voltage of the power converter. The digital output of the A/D converter 11 is then sent to a feedback compensation unit 12 (e.g., micro-controller or programmable logic circuit such as FPGA or CPLD) to implement the feedback compensation function in accordance to a reference $V_{ref}$, so as to stabilize the feedback loop. An output signal is generated by a signal generator 13 to control the power switches of the power converter to regulate the output voltage.

For most applications, the bandwidth of the system shown in FIG. 1 is limited by the sampling speed of the A/D converter 11. For a system requiring higher resolution and bandwidth, the power consumption of the controller increases significantly. For example, a 10-time-speed improvement in the A/D converter 11 could increase the power consumption of the A/D converter 11 by 3–5 times. Therefore, a high-speed high-resolution A/D converter is high power consuming.

In a low-cost application, instead of using an expensive high-speed high-resolution A/D converter, either a high-speed low-resolution or a low-speed high-resolution A/D converter is used. A high-speed low-resolution A/D converter can easily meet the requirement of the dynamic response due to the high bandwidth control, it, however, could have problem with the steady state requirement of the system. On the other hand, a low-speed high-resolution A/D converter can easily meet the requirement of the steady state, but could have problem with dynamic responses.

Therefore, there is a need for a new digital converter resolution which is low in cost and power consumption but is still able to meet both dynamic transient and steady state requirements of the system.

The present invention provides a novel digital controller in which two control paths are employed instead of one. In particular, each control path has an A/D converter and a compensation unit, and the two A/D converters have different sampling speeds and/or resolutions to meet both requirements of dynamic response and steady state. Thus, a costly and high power consumption high-speed high resolution A/D converter can be replaced by a combination of a high-speed low resolution A/D converter and a low-speed high-resolution A/D converter.

Preferably, the sampling speeds of the two A/D converters are substantially different such that the control of the two control paths is de-coupled and will not interfere with each other. The two control paths may sense the same signal source or different digital sources.

BRIEF EXPLANATION OF THE DRAWINGS

The above and other features and advantages will be clearer from the detailed description of the preferred embodiments of the present invention with reference to the accompanying drawings in which.

DETAILED DESCRIPTION OF THE PREFERRED EMBODIMENT

Figure 1:
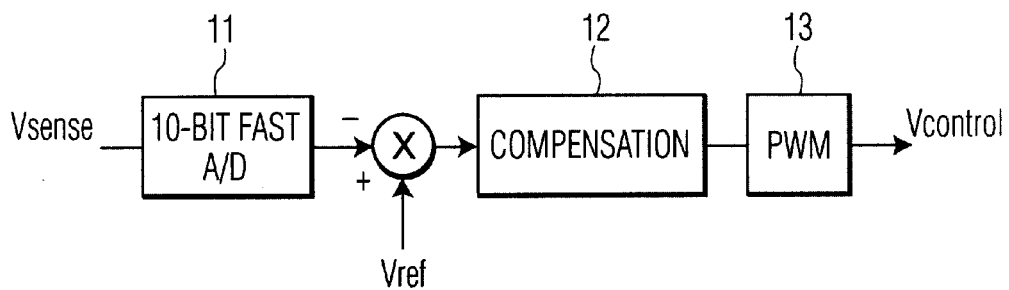
FIG. 1 is a conventional digital controller with a single control path.
Figure 2:
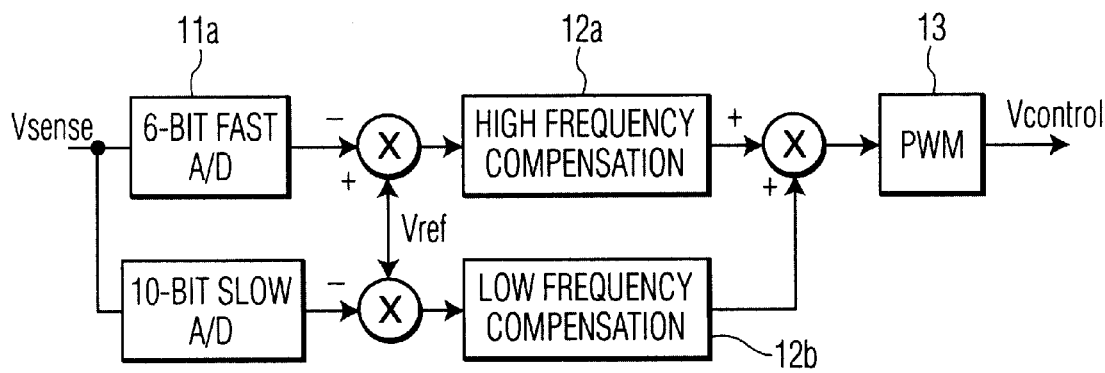
FIG. 2 is a first employment of the present invention incorporating two control paths, in which the two paths sense the same signal source.

As shown in FIG. 2, instead of a single control path (with a A/D converter) in the prior art shown in FIG. 1, two control paths are used in the present invention each having an A/D converter. One path deals with the fast responses of the system, such as dynamic transient, while the other deals with the slow responses, such as steady state.

In particular, the first control path comprises a fast-speed low-resolution (e.g., 6-bit) A/D converter 11a and a high frequency compensation unit 12a, and the second control path comprises a low-speed high-resolution (e.g., 10-bit) A/D converter 11b and a low frequency compensation unit 12b. The two paths sense the same signal resource $V_{sense}$, e.g., the output voltage or current of the power converter, and use the same reference $V_{ref}$.

A/D converter 11a has a fast sampling speed to control fast transient, while A/D converter 11b has a high resolution to control steady state. Both A/D converters 11a and 11b is of low power consumption and low cost. The total power consumption of the two A/D converters 11a and 11b is half or even less than a single 10-bit fast A/D converter.

For transient, the power converter usually has less strict specification compared with the one in steady state, thus a low-resolution A/D converter (e.g., 6-bit A/D converter 11a) is sufficient to control the dynamic changes. The low-resolution A/D converter 11a also requires a reduced sampling clock frequency compared with a high-resolution A/D converter (e.g., 10-bit A/D converter 11b) with the same sampling speed, which results in lower power consumption and cost.

The 10-bit A/D converter 11b controls the steady state of the system. The bandwidth of this path and therefore the sampling speed of the A/D converter 11b can be much lower. The sampling speed of the A/D converter 11b can be selected 10–100 times slower than that of the 6-bit A/D converter 11a.

The outputs of both the two paths are sent to a signal generator 13, such as PWM or VCO, to generate a control signal $V_{control}$ which will be sent to the regulated system, such as a power converter.

Preferably, in order to de-couple the control of the two paths, one path has a much higher sampling speed or bandwidth than the other. For example, A/D converter 11a has a sampling speed as 10–100 times fast as that of A/D converter 11b.

Both the A/D converters 11a and 11b are much lower in cost and power consumption as compared to a high-speed high resolution A/D converter. Therefore, the total cost and the power consumption of the two A/D converters 11a and 11b can be reduced significantly as compared to the prior art in which an expensive and high power consumption single high-speed high-resolution A/D converter is used. At the same time, each control path can have a simpler algorithm, which also reduces the calculation time of the compensations if the control is implemented in software.

Figure 3:
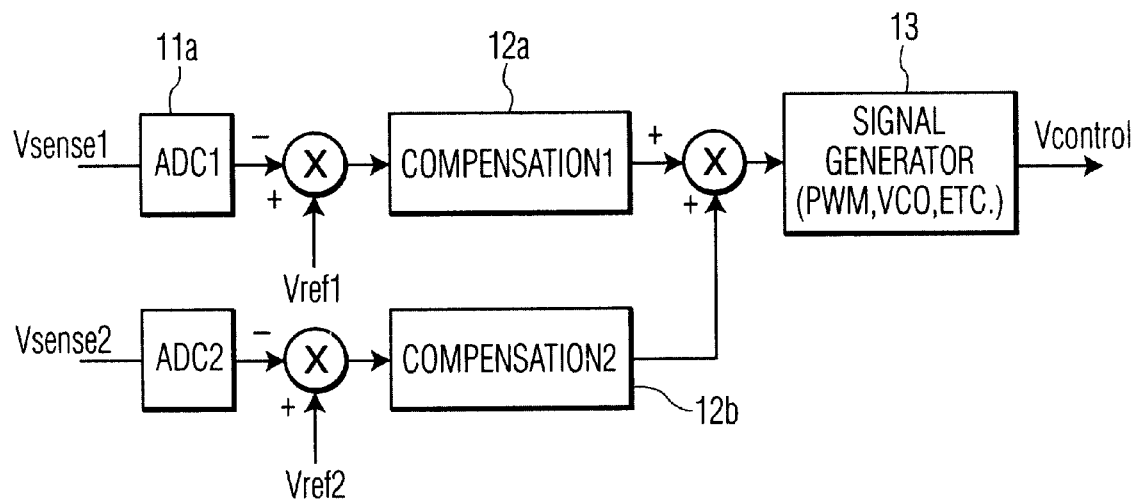
FIG. 3 is a second employment of the present invention incorporating two control paths, in which the two paths sense two different signal sources.

The two paths can have the same sensed signal sources as shown in FIG. 2, such as the output voltage of the power converter, or have different sensed sources such as voltage and current, as shown in FIG. 3 in which the two paths sense different signal sources $V_{sense1}$ and $V_{sense2}$, each with own reference $V_{ref1}$ and $V_{ref2}$, respectively. The output of the two paths are sent to a signal generator 13 to generate a control signal $V_{control}$. The signal generator can be a PWM such as in flyback, buck and boost circuits or a VCO such as in resonant circuits.

Although preferred embodiments have been described in detail as above, it shall be appreciated that numerous changes and variations are possible to a skilled person in the art without departing the spirit of the invention. Thus, the scope of the invention is solely limited in the following claims.

What is claimed is:

1. A digital controller for generating a control signal comprising two control paths each having an analog-to-digital converter and a feedback compensation unit, wherein said two converters are different in sampling speed.

2. The digital controller of claim 1 wherein said two converters are also different in resolution.

3. The digital controller of claim 2 wherein one of said converter has a sampling speed high enough for a fast response and the other converter has a resolution high enough for a slow response.

4. The digital controller of claim 1 wherein said two control paths have a common sensed source.

5. The digital controller of claim 4 wherein said two control paths have a common reference.

6. The digital controller of claim 1 wherein said two control paths have different sensed sources.

7. The digital controller of claim 6 wherein said two controller paths have different references.

8. The digital controller of claim 1 wherein one of said converters has a sampling speed at least 10 times faster than that of another converter.

9. The digital controller of claim 8 wherein one of said converters has a sampling speed 100 times faster than that of another converter.

10. The digital controller of claim 1 further comprises a generator for generating said control signal from outputs of both control paths.

11. A digital controller for generating a control signal comprising two control paths combined to generate said control signal, each having an analog-to-digital converter and a feedback compensation unit.

12. The digital controller of claim 11 wherein said two converters are different in sampling speed and/or resolution.

13. The digital controller of claim 12 wherein said two converters are parallel arranged to sense a common signal source.

14. The digital controller of claim 13 wherein said two converters are arranged to sense two different signal sources respectively.

15. A digitally controlled power converter comprising a digital controller for generating a control signal, wherein said digital controller comprises a first control path having a first analog-to-digital converter and a second control path having a second analog-to-digital converter, wherein said first converter has a higher sampling speed than said second converter.

16. The power converter of claim 15 wherein said first converter has a lower resolution than said second analog-to-digital converter.

17. The power converter of claim 15 wherein said two converters sensed signals from a same signal source.

18. The power converter of claim 17 wherein said signal source is an output voltage or current of said power converter.

19. The power converter of claim 15 wherein said first analog-to-digital converter senses an output voltage of said power converter, and said second analog-to-digital converter senses an output current of said power converter.

\* \* \* \* \*